United States Patent
Haimi

(10) Patent No.: US 9,446,893 B2
(45) Date of Patent: Sep. 20, 2016

(54) SHEET MATERIAL WITH INTEGRALLY FORMED ONE-WAY VALVE

(75) Inventor: Shlomo Uri Haimi, Or Akiva (IL)

(73) Assignee: VP SHEETS LTD., Or Akiva (IL)

(*) Notice: Subject to any disclaimer, the term of this patent is extended or adjusted under 35 U.S.C. 154(b) by 0 days.

(21) Appl. No.: 13/459,186

(22) Filed: Apr. 29, 2012

(65) Prior Publication Data

US 2013/0284738 A1   Oct. 31, 2013

(51) Int. Cl.
| | |
|---|---|
| *B65D 41/00* | (2006.01) |
| *B65D 81/20* | (2006.01) |
| *B32B 7/04* | (2006.01) |
| *B32B 3/26* | (2006.01) |

(52) U.S. Cl.
CPC .......... *B65D 81/2076* (2013.01); *B32B 3/266* (2013.01); *B32B 7/045* (2013.01); *B65D 81/2023* (2013.01); *B65D 81/2038* (2013.01); *B65D 81/2053* (2013.01); *B65D 81/2061* (2013.01); *B65D 81/2069* (2013.01); *B32B 2439/00* (2013.01); *Y10T 428/24322* (2015.01)

(58) Field of Classification Search
CPC .......... B65D 51/1633; B65D 51/1644; B65D 51/165; B65D 81/2076; B65D 81/2023; B65D 81/2038; B65D 81/2061; B65D 81/2069; B65D 81/2053; B32B 7/045; B32B 2439/00
USPC .................. 215/307, 310, 311; 220/203.16; 137/851; 383/103
See application file for complete search history.

(56) References Cited

U.S. PATENT DOCUMENTS

| | | | | |
|---|---|---|---|---|
| 3,716,180 A | * | 2/1973 | Bemiss et al. | 229/120 |
| 4,134,535 A | * | 1/1979 | Barthels et al. | 383/102 |
| 4,653,661 A | * | 3/1987 | Buchner et al. | 220/203.16 |
| 5,395,006 A | * | 3/1995 | Verma | 220/371 |
| 5,427,839 A | * | 6/1995 | Buchner | B65D 77/225 137/246 |
| 5,782,266 A | * | 7/1998 | Domke | 137/551 |
| 6,662,827 B1 | * | 12/2003 | Clougherty et al. | 137/859 |
| 7,611,557 B2 | * | 11/2009 | Hoffman | 55/385.6 |
| 7,784,630 B2 | * | 8/2010 | Walsh | 215/307 |
| 2005/0036718 A1 | * | 2/2005 | Wu et al. | 383/103 |
| 2006/0030472 A1 | * | 2/2006 | Hartman | B31B 19/84 493/213 |
| 2006/0050999 A1 | * | 3/2006 | Blythe et al. | 383/63 |
| 2007/0110343 A1 | * | 5/2007 | Buchman | B65D 33/01 383/63 |
| 2009/0289073 A1 | * | 11/2009 | Moore et al. | 220/745 |
| 2011/0026861 A1 | * | 2/2011 | Newrones | B31B 19/84 383/211 |

* cited by examiner

*Primary Examiner* — Fenn Matthew
*Assistant Examiner* — Don M Anderson
(74) *Attorney, Agent, or Firm* — Mark M. Friedman

(57) ABSTRACT

A sheet material for use in packaging having at least a first layer and at lease a second layer, wherein the first layer and the second layer are bonded together to fabricate the sheet material such that an area between the first layer and the second layer is unbonded so as to create a passageway having at least one opening on a first side of the sheet material and at least one opening on a second side of the sheet material, the passageway being a one-way valve integrally formed by bonding together the first and second layers to form the sheet material.

6 Claims, 8 Drawing Sheets

SHEET MATERIAL WITH INTEGRALLY FORMED ONE-WAY VALVE

FIELD AND BACKGROUND OF THE INVENTION

The present invention relates to raw sheet material for use in the manufacture of packaging and, in particular, it concerns a multi-layer sheet material in which a one-way valve is integrally formed by the bonding together of the layers to form the sheet material.

It is known to provide packaging material that include a means for creating a pressure differential inside a container formed of such material such as bags. That majority of such containers are designed to create a vacuum state within the container in order to preserve the contents. However, such means currently in use in the art are separate valve structures that are added to the sheet material of the container at the time of manufacture.

It will be readily understood that the inclusion of such valve means adds considerable cost to the manufacturing of these packaging containers.

There is therefore a need for a multi-layer sheet material in which a one-way valve is integrally formed by the bonding together of the layers to form the sheet material.

SUMMARY OF THE INVENTION

The present invention is a multi-layer sheet material in which a one-way valve is integrally formed by the bonding together of the layers to form the sheet material.

According to the teachings of the present invention there is provided, a sheet material for use in packaging, the sheet material comprising: (a) at least a first layer; (b) at lease a second layer; wherein the first layer and the second layer are bonded together to fabricate the sheet material such that an area between the first layer and the second layer is unbonded so as to create a passageway having at least one opening on a first side of the sheet material and at least one opening on a second side of the sheet material, the passageway being a one-way valve integrally formed by bonding together the first and second layers to form the sheet material.

According to a further leaching of the present invention, the first layer configured with at least two through bores and the second layer configured with at least one through bore such that when the first layer and the second layer are bonded together to fabricate the sheet material the unbonded area circumscribes all of the bores in both the first layer and the second layer so as to create a passageway between the through bores configured in the first layer and the through bores configured in the second layer and thereby integrally forming the one-way valve.

According to a further teaching of the present invention, the one-way valve is configure to create a vacuum state within a container constructed at least partially from the sheet material.

According to a further teaching of the present invention, the one-way valve is configure to create a vacuum state within a container at least sealed by the sheet material.

According to a further teaching of the present invention, the one-way valve is configure to create a pressurized state within a container constructed at least partially from the sheet material.

According to a further teaching of the present invention, the one-way valve is configure to create a pressurized state within a container at least sealed by the sheet material.

There is also provided according to the teachings of the present invention, a container in which a pressure differential is created and maintained, the container comprising a sheet material fabricated by the bonding together of a first layer and a second layer such that an area between the first layer and the second layer is unbonded so as to create a passageway having at least one opening on a first side of the sheet material and at least one opening on a second side of the sheet material, the passageway being a one-way valve integrally formed by bonding together the first and second layers to form the sheet material, wherein the sheet material constitutes at least a portion of the container.

According to a further teaching of the present invention, the sheet material constitutes at least a portion of a packaging bag.

According to a further teaching of the present invention, the sheet material constitutes at least a portion of sealing material attached to a solid container.

According to a further teaching of the present invention, the sheet material constitutes at least two portions of the container each the portion including at least one the one-way valve so as to allow for atmosphere replacement within the container.

There is also provided according to the teachings of the present invention, a method for fabricating sheet material for use in packaging, the method comprising: (a) providing at least a first layer; (b) providing at lease a second layer; (c) bonding together the first layer and the second layer such that an area between the first layer and the second layer is unbonded so as to create a passageway having at least one opening on a first side of the sheet material and at least one opening on a second side of the sheet material, the passageway being a one-way valve integrally formed by bonding together the first and second layers to form the sheet material.

According to a further teaching of the present invention, there is also provided: (a) providing the first layer configured with at least two through bores; (b) providing the second layer configured with at least one through bore; (c) bonding together the first layer and the second layer such that the unbonded area circumscribes all of the through bores in both the first layer and the second layer so as to create the passageway between the through bores configured in the first layer and the through bores configured in the second layer and thereby integrally forming the one-way valve by the bonding together of the first and second layers to form the sheet material.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a multi-layer sheet material in which a one-way valve is integrally formed by the bonding together of the layers to form the sheet material.

The principles and operation of a multi-layer sheet material according to the present invention may be better understood with reference to the drawings and the accompanying description.

By way of introduction, the present invention relates to sheet material that allows fluid, either gaseous or liquid, to flow from one side of the sheet to the other side in one direction, while blocking fluid flow in the opposite direction. This may be used to control the atmosphere of the interior of the container such as, but not limited to, creating a vacuum state, creating a pressurized state and replacing the ambient atmosphere with inert gases such as, but not limited to nitrogen. This characteristic is made possible by the production of a one-way valve, portions of which are formed in each of the layers, that is integrally formed by the bonding together of the two layers during the fabrication of the raw sheet material. Please note that the term "fluid" is used herein to refer to substantially any substance that is in either gaseous or liquid form.

That is to say, during the fabrication of the sheet material of the present invention, a passageway is formed between at least one entry opening located on one side of the sheet material and at least one exit opening located on the other (opposite) side of the sheet material, thereby allowing the flow of fluid through the sheet material in one direction when a pressure differential exists between the two sides of the sheet material such that the pressure is higher on the inlet side of the one-way valve than on the outlet side of the one-way valve. It will be understood that when a pressure differential exists such that the pressure is higher on the outlet side of the one-way valve than on the inlet side of the one-way valve the higher pressure presses the layers together, thereby closing the one-way valve.

The sheet material of the present invention may be fabricated from, for example, plastics and metal foils, and used to benefit as the raw material for the construction of, by non-limiting example, flexible bags, and for sealing the openings of hard containers such as, but not limited to, jars and bottles. It should be noted that each of the layers referred to herein may themselves be constructed from a plurality of layers.

It will also be appreciated that the elastic characteristics of the layer need not be the same. That is to say, one of the layers my be, by non-limiting example, more flexible and/or more stretchable than the other layer.

Containers made from, or sealed by, the sheet material of the present invention may be used to benefit in the fields of medicine, chemistry, the food industry as well as any other use in which control of the atmospheric characteristics of the interior of the container is of benefit.

Figure 1:
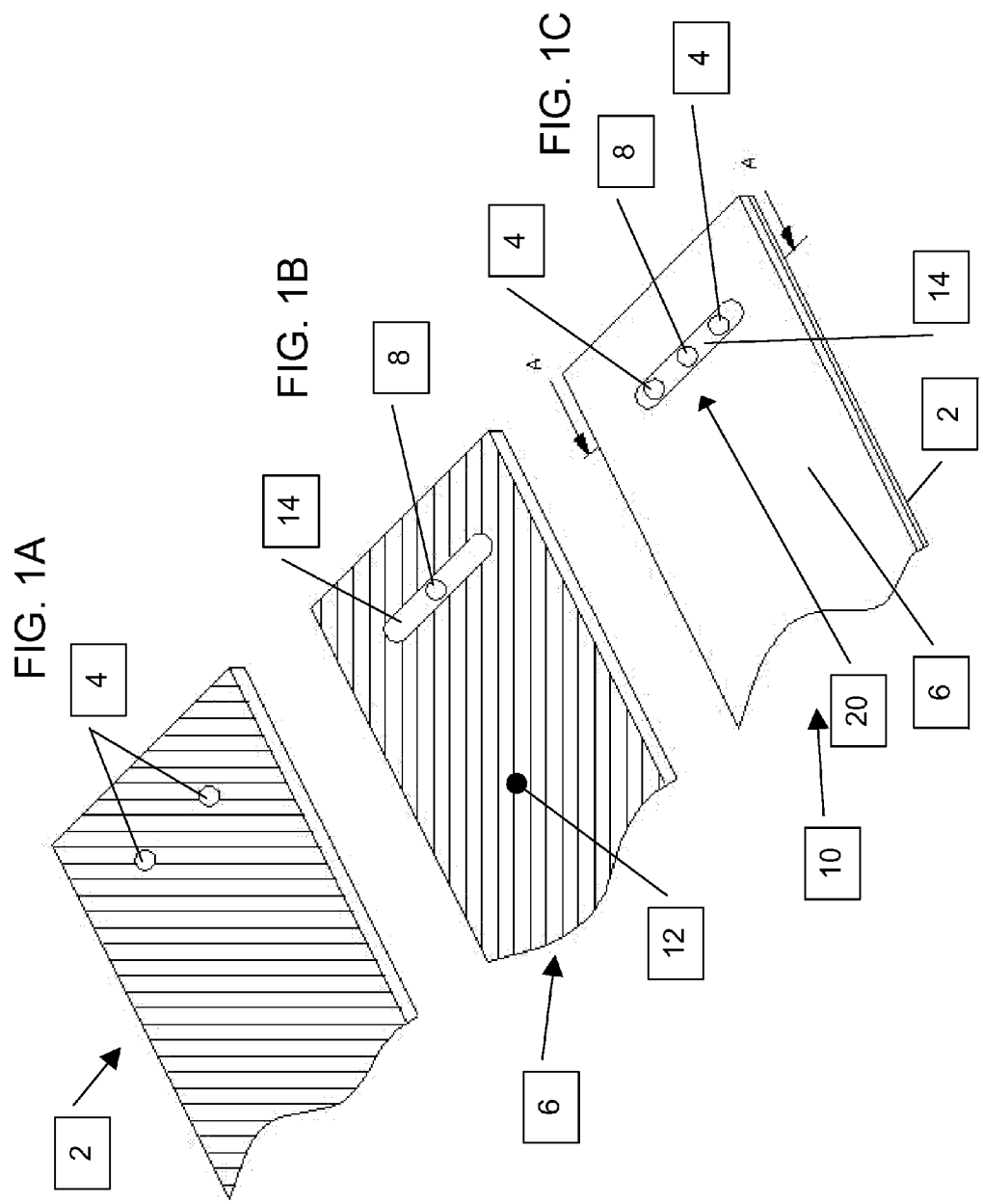
FIG. 1A is an isometric top view of a preferred embodiment of a first layer for the fabrication of a first preferred embodiment of the sheet material of the present invention.
FIG. 1B is an isometric top view of a preferred embodiment of a second layer for the fabrication of a first preferred embodiment of the sheet material of the present invention.
FIG. 1C is an isometric top view of a first preferred embodiment of the sheet material of the present invention fabricated by the bonding together of the sheets of FIGS. 1A and 1B.

Referring now to the drawings, FIG. 1A illustrates a first layer 2 to be used for the fabrication of the first preferred embodiment of the multi-layer sheet material 10 of the present invention. This layer 2 is illustrated here with two through bores for the passage of fluid.

FIG. 1B illustrates a second layer 6 to be used for the fabrication of the first preferred embodiment of the multi-layer sheet material 10 of the present invention. This layer 6 is illustrated here with one through bore for the passage of fluid.

Crosshatched area 12 shown on layer 6 indicates the area in which the first layer 2 and the second layer 6 are bonded during fabrication. The unmarked area 14 shown on layer 6 indicates the area in which the first layer 2 and the second layer 6 are not bonded during fabrication. As illustrated in FIG. 1C, once the two layers 2 and 6 are bonded together, the non-bonded area 14 defines a passageway 14 between through bores 4 and 8, therefore providing for the passage of fluid from one side of the sheet material 10 to the other side.

It will be readily understood that the combination of the through bores 4 in layer 2, the through bore 8 in layer 6 and the passageway 14 provides a one-way valve 20 that is integrally formed by the bonding together of the two layers during the fabrication of the raw sheet material.

It should be noted that the size and shape of the non-bonded area 14 may be varied as necessary as long as the non-bonded area 14 circumscribes all of the through bores 4 and 8 configured in both layers 2 and 6. It will be appreciated that the layers may be bonded in area 12 by substantially any method known in the art such as, but not limited to, lamination, heat sealing, gluing and the like.

It should also be noted that while the illustrations here in include two through bores in one layer and one hole in the other layer, and the placement of the through bores is symmetrical, this is for illustrative purposes only and the number and placement of the through bores may be varied to suit the design needs of a particular application of the sheet material.

Figure 2:
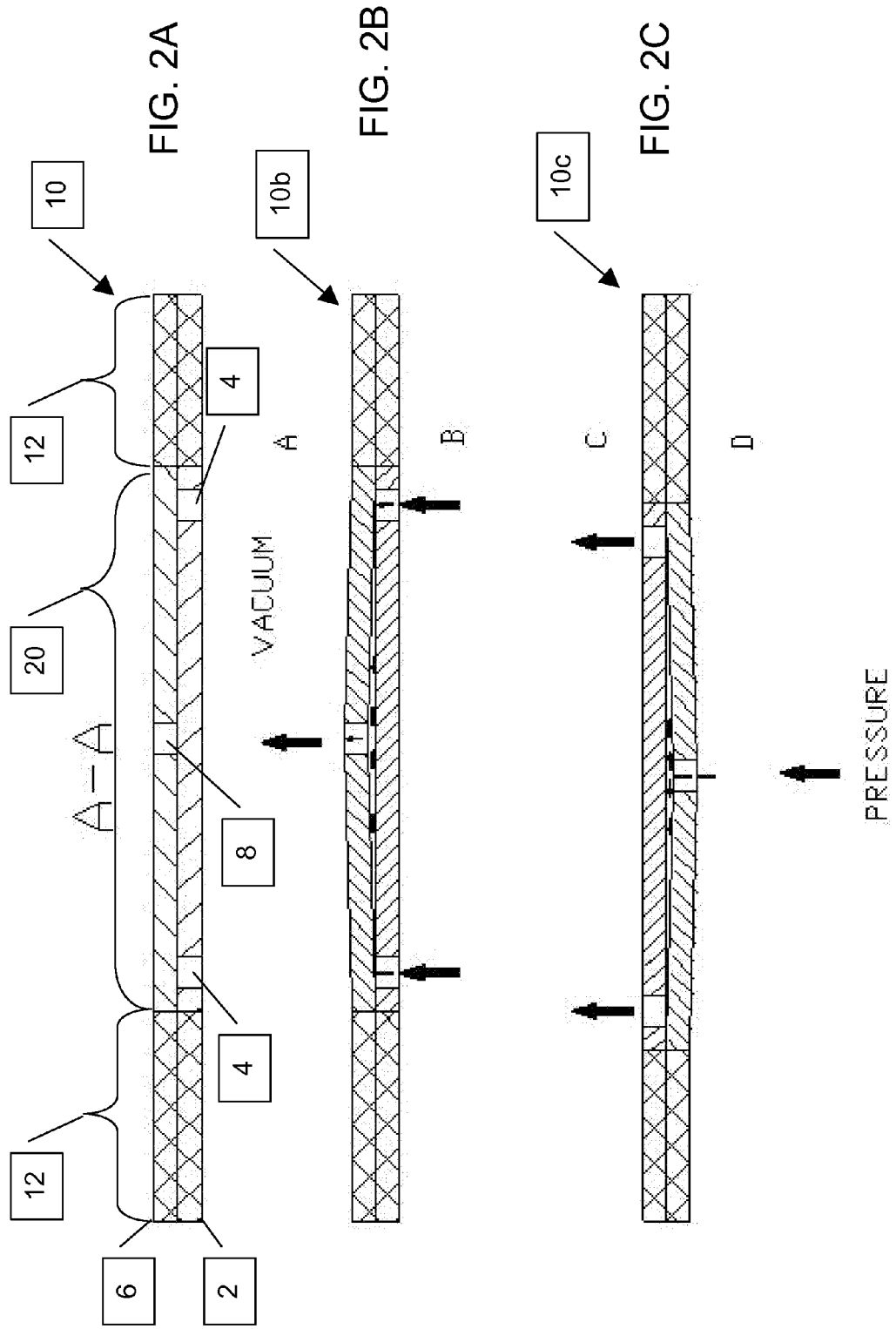
FIG. 2A is a side elevation of the sheet material of FIG. 1C taken along line A-A, showing the sheet material at rest.
FIG. 2B is a side elevation of the sheet material of FIG. 1C taken along line A-A, showing the sheet material while creating a vacuum state within the container.
FIG. 2C is a side elevation of the sheet material of FIG. 1C taken along line A-A, showing the sheet material while creating a pressurized state within the container.

The cross-sectional view of FIG. 2A illustrates the sheet material 10 of the present invention including the one-way valve 20, illustrated here in an at rest state.

The cross-sectional view of FIG. 2B illustrates the process of creating a vacuum state within a container such as, but not limited to, a bag constructed from the sheet material 10 of the present invention.

Region A represents the outside of the bag (a first side of the sheet material) and region B represents the interior of the bag (a second side of the sheet material). When the bag is filled and sealed, the interior is at atmospheric pressure. The creation of a vacuum state (i.e., below atmospheric pressure) by the use of a vacuum unit, a vacuum tube or any other means known in the art, creates a pressure differential across the one-way valve 20, configured in sheet 10b, that will result in the higher pressure fluid within the bag (region B) to pass through the one-way valve 20 to the exterior of the bag (region A) in order to reach balanced pressure (equilibrium), as illustrated by the arrows. Once pressure equilibrium is reached, the one-way valve 20 will assume the rest state illustrated in FIG. 2A, thereby sealing the through bores while in turn seals the one-way valve 20 so as not to allow the fluid to re-enter the bag. When the vacuum state on the outside of the bag is terminated, the bag will remain in a vacuum state.

A container constructed from the sheet material of the embodiment of FIG. 2B may be used to benefit as follows:
  Allows removal of unwanted gas/fumes/moisture from the interior of the bag/container into the atmosphere.
  Allows release of harmful gases from bags or containers containing fruit and vegetables, preventing them from spoiling and becoming ruined.
  Allow cooking in the microwave/hot water/oven without any risk of the bag exploding as a result of the pressure created by the exposure to heat.
  Preserve medicines, vitamins and supplements in containers designed to store medicines. The use of the sheet material of the present invention will replace the need for a desiccant (silica gel). A product packed in a vacuum pack is preserved much better than if packed with a Silica gel desiccant.

The cross-sectional view of FIG. 2C illustrates the process of creating a pressurized state within a container such as, but not limited to, a bag constructed from the sheet material 2 of the present invention.

Region D represents the outside of the bag and region C represents the interior of the bag. When the bag is filled and sealed, the interior is at atmospheric pressure. The creation of a pressurized state (i.e., above atmospheric pressure) by the use of a pressure unit, a pressure tube or any other means known in the art, creates a pressure differential across the one-way valve 20, configured in sheet 10c, that will result in the higher pressure fluid from the exterior of the bag (region D) to pass through the one-way valve 20 to the interior of the bag (region C) to in order to reach balanced pressure (equilibrium), as illustrated by the arrows. Once pressure equilibrium is reached, the one-way valve 20 will assume the rest state illustrated in FIG. 2A, thereby sealing the through bores while in turn seals the one-way valve 20 so as not to allow the fluid to re-enter the bag. When the pressurized state on the outside of the bag is terminated, the bag will remain in a pressurized state.

Figure 3:
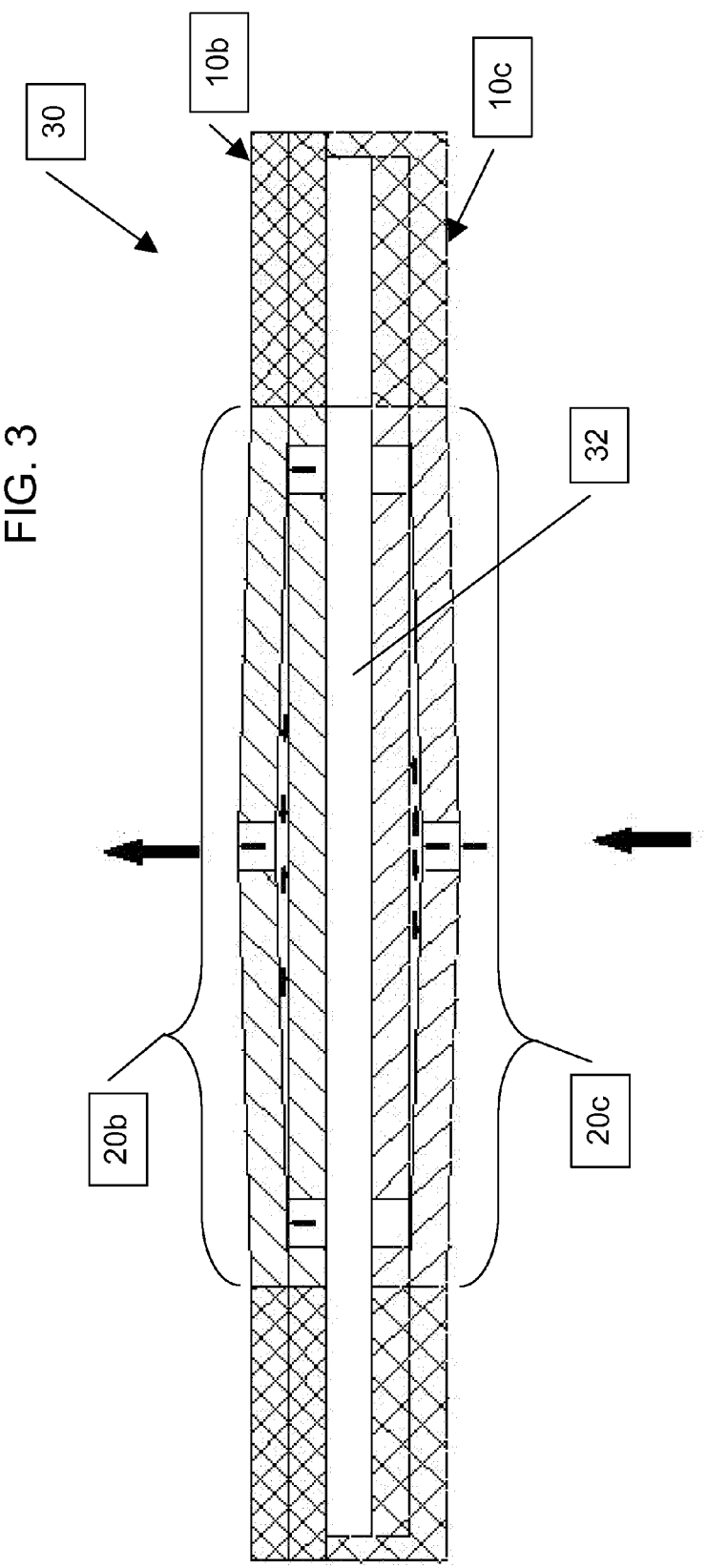
FIG. 3 is a side elevation of two sheets of the sheet material of the present invention used together to fabricate a container for use in atmosphere replacement.

The cross-sectional view of FIG. 3 schematically illustrates the process of atmosphere replacement within a container such as, but not limited to, a bag constructed from two sheets of the sheet material 10 of the present invention.

Many products are sensitive to air, oxygen and humidity. One way to extend the shelf life of these products is by extracting the air, including the humidity and oxygen, and replacing them with an inert gas such as, but not limited to, Nitrogen—CO2, as is know in the art of food packaging. For other products, oxygen is added in order to make the product look fresh. The method of replacing the air with gas is known in the industry and is used frequently, but special equipment is required in order to replace the atmosphere and different methods are used. The present invention offers a simple and inexpensive way to achieve a solution that does not require investing in special equipment or processes.

Figure 8:
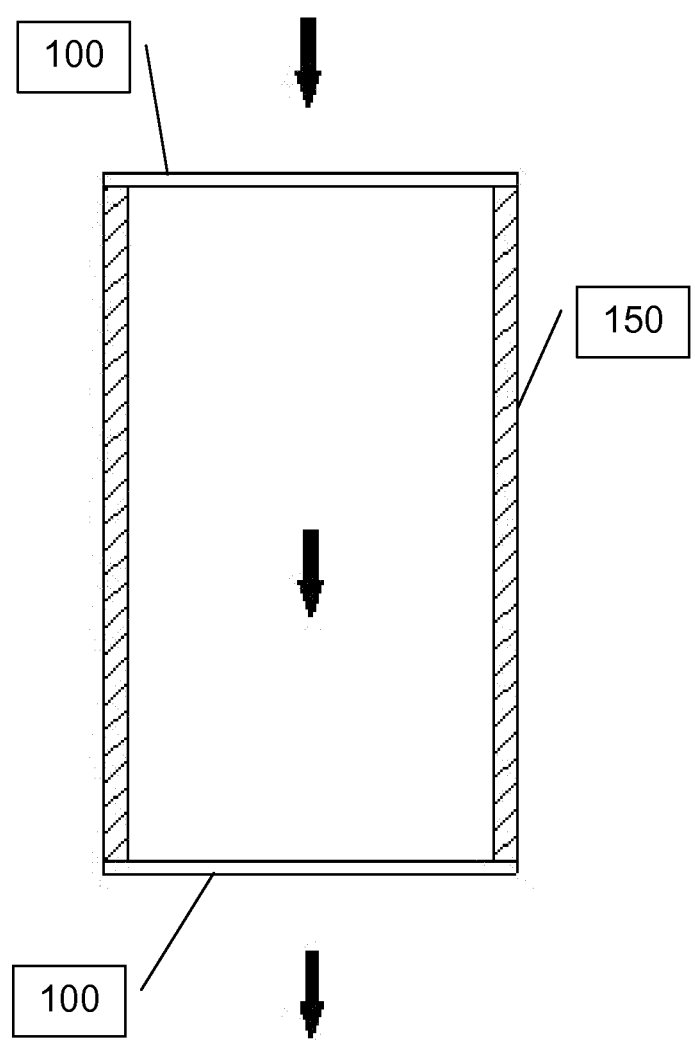
FIG. 8 is a side elevation of the process of atmosphere replacement according to the teachings of the present invention.

As mentioned above, the cross-section of FIG. 3 illustrates a bag 30 constructed from two sheets of the sheet material of the present invention. The upper sheet 10b is fabricated as a vacuum sheet as described above with regard to FIG. 2B, while the lower sheet 10c is fabricated as a pressure sheet as described above with regard to FIG. 2C. The two sheets 10b and 10c define between them an interior region 32 of the bag 32. The process of atmosphere replacement is accomplished by introducing the desired replacement gas under pressure at one-way valve 20c. The original atmospheric gas is forced out of the bag through one-way valve 20b and is thereby replaced by the new introduced replacement gas. The process can be expedited by creating a vacuum state at one-way valve 20b, thereby forcibly extracting the original atmospheric gas from the bag. The process of atmosphere replacement in a solid container 150 is illustrated in FIG. 8.

Figure 4:
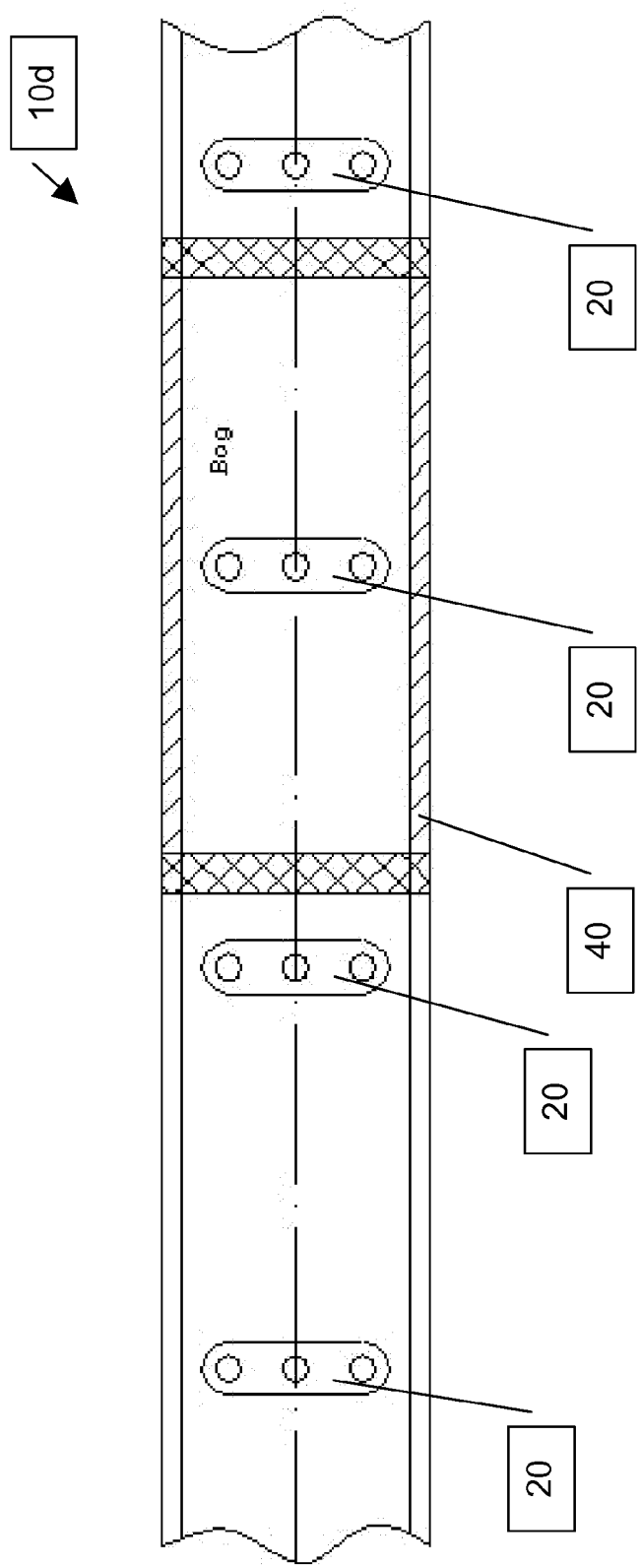
FIG. 4 is a top elevation of a method of fabricating a packaging bag constructed and operational according to the teachings of the present invention.

FIG. 4 illustrates, by schematic example, a suggested method of mass-producing a packaging bag using at least one sheet of the sheet material of the present invention. As seen in this top elevation, a sheet 10d of the sheet material of the present invention is fabricated with a plurality of spaced apart one-way valves 20. During production, a portion of sheet 10d that includes at least one one-way valve 20 is bonded to a second sheet of suitable packaging sheet material (not shown) along the crosshatched area 40, thereby creating a packaging bag as in known in the art.

Figure 5:
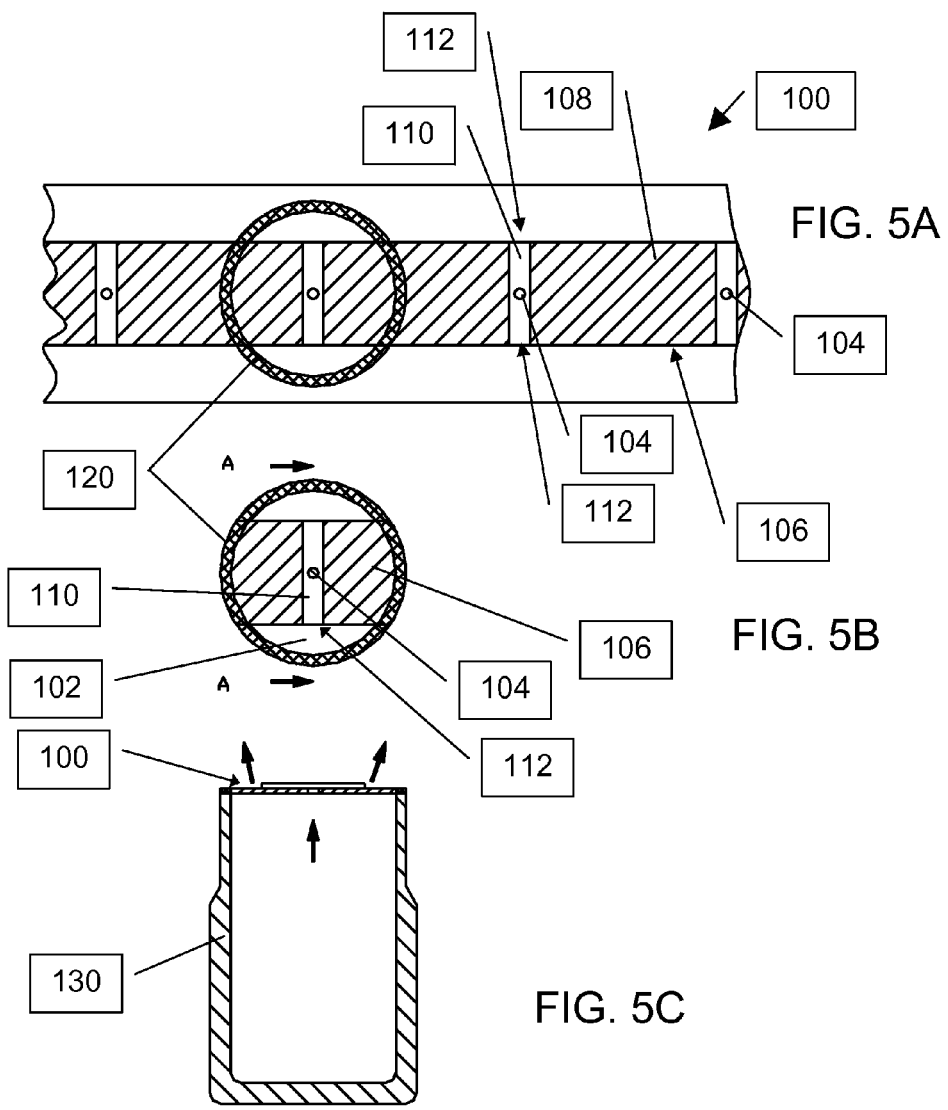
FIG. 5A is a top elevation of a second preferred embodiment constructed and operational according to the teachings of the present invention, this embodiment suitable of sealing hard containers.
FIG. 5B is a top elevation of a portion of the sheet material of FIG. 5A attached to a container.
FIG. 5C is a side elevation of FIG. 5B, in which a portion of the sheet material of FIG. 5A attached to a container.

As mentioned above, the sheet material on the present invention may be used to benefit with respect to sealing solid containers such as, but not limited to, bottles and jars. To that end, FIG. 5A illustrates a band of a second embodiment of the sheet material 100 of the present invention.

This embodiment includes a base layer 102 that includes a plurality of through bores 104 spaced apart along its length. A second layer 106 is bonded to the base layer in the crosshatched areas 108 and not bonded to the base layer in areas 110, thereby creating a passageway between the through bore 104 and exit points 110 at the edge of layer 106 so as to create the one-way valve of the present invention. FIGS. 5B and 5C are a top elevation and a side section respectively of a portion of the sheet material 100 of FIG. 5A attached along area 120 to a solid container 130.

Figure 6:
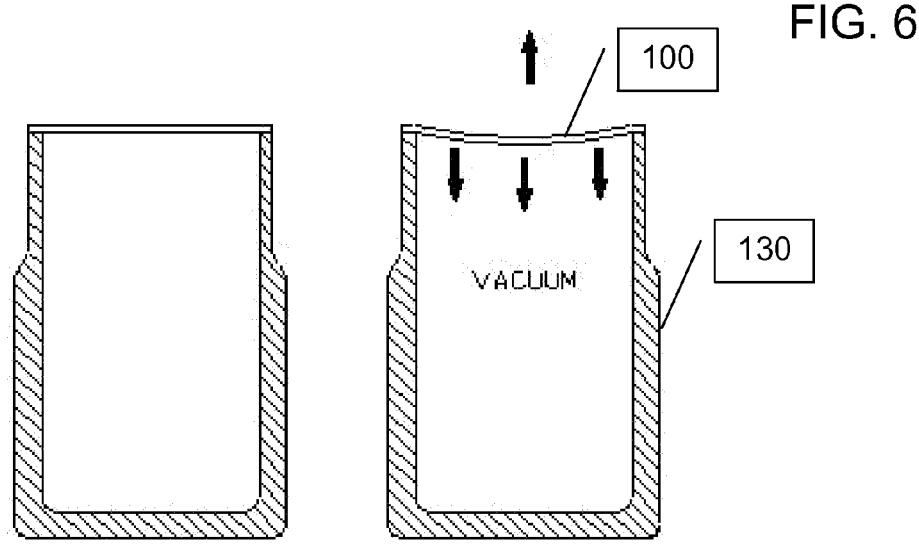
FIG. 6 is the side elevation of FIG. 5C showing the process of creating a vacuum state within the container.

The result of performing on container 130 the processes for creating a vacuum state within the contain as described above with regard to FIG. 2B is illustrated in FIG. 6.

Figure 7:
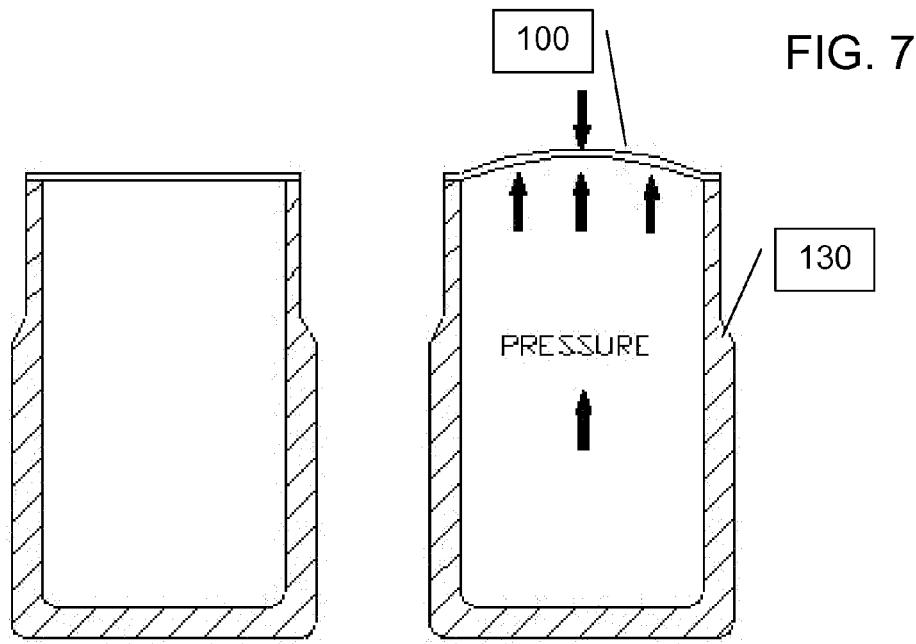
FIG. 7 is the side elevation of FIG. 5C showing the process of creating a pressurized state within the container.

Similarly, result of performing on container 130 the processes for creating a pressurized state within the container as described above with regard to FIG. 2C is illustrated in FIG. 7.

The process illustrated in FIG. 7 may also be use to benefit with regard to bottles used for storing liquids.

Currently, there are two types of liquids packaged in plastic bottles, carbonated liquids and non-carbonated liquids such as, but not limited to, juices, oil, water, milk, chocolate milk and the like.

Plastic bottles in which carbonated liquids are store have a mechanical advantage created by the pressurized gas inside that adds to the overall strength of the bottle when stacked such as during transit or storage.

Plastic bottles used for non-carbonated liquids lack the pressurized gas and therefore, the mechanical advantage thereby created during transit or n storage. This limits the stacking ability of such bottles and over stacked bottles on the bottom layers may collapse and are damaged as a result of the weight applied to them.

The use of the sheet material of the present invention as a seal on bottles in which non-carbonated liquids are stored will allow pressure to be added to the bottle and thereby create the mechanical advantage enjoyed by pressurized bottles in carbonated liquids are stored.

Additional advantages associated with the use of using the sheet material of the present invention include:

- As a result of the existing bottles not holding up, there is a tendency to make the bottle much thicker than necessary in order to obtain the desired mechanical strength. By adding pressure to the bottle, the bottle can be made much less thick, thus saving very significant quantities of plastic in the manufacture of the bottles.
- The sheet can be used as proof upon opening of the bottle that it was sealed properly.
- The gas added to the bottle may be inert gas that will serve to extend the shelf life of the product.

Figures 9A, 9B:
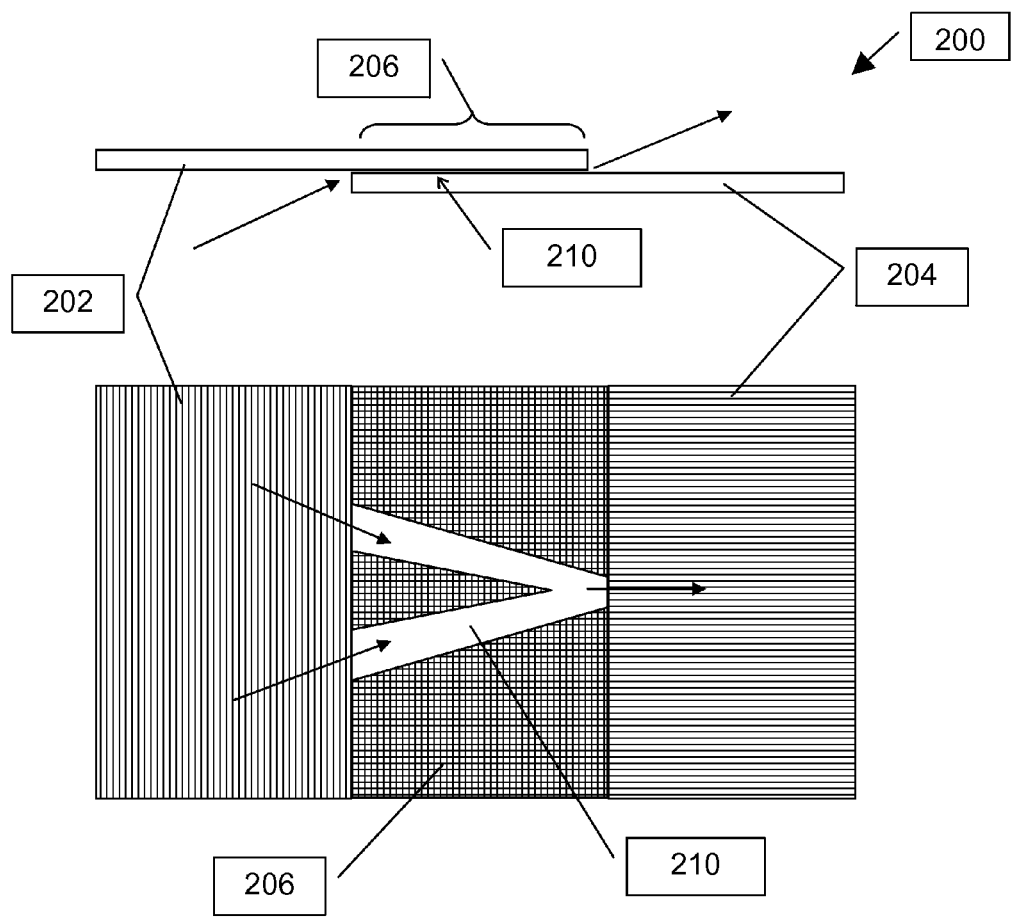
FIG. 9A is a side elevation of a third preferred embodiment of sheet material constructed and operational according to the teachings of the present invention.
FIG. 9B is a top elevation of the sheet material of FIG. 9A illustrating the one-way valve that is integrally formed by the bonding together of the layers to form the sheet material.

Turning now to the third preferred embodiment 200 of the sheet material of the present invention as illustrated in FIGS. 9A and 9B. In this embodiment, the one-way valve passageway is created when the first layer 202 is bonded to the second layer 204 in the overlapping area 206. During the bonding process, a portion of the overlapping area that traverses the overlapping area is not bonded, thereby creating a fluid flow passageway the passes through the finished sheet material from one side (region E) of the sheet to the other side (region F) of the sheet. As in the embodiments described above, fluid is able to flow through passageway 210 in the direction indicated by the arrows, for example, when the pressure in region F is higher than the pressure in region E such that passageway 210 is a one-way valve that is integrally formed by the bonding together of the layers 202 and 204 to form the sheet material 200.

It will be appreciated that the above descriptions are intended only to serve as examples and that many other embodiments are possible within the spirit and the scope of the present invention.

What is claimed is:

1. A sheet material for use in packaging for closing containers, the sheet material comprising:
   (a) a band of at least a first planar layer having a first width;
   (b) a band of at least a second planar layer having a second width, said second width being less than said first width;
   wherein said first layer and said second layer are bonded together across an entire width of said second planar layer to fabricate a band of the sheet material, in which said first and second layers are substantially parallel and said first planar layer and said second planar layer are coextensive along at least a length of the sheet material, said bonding being such that along said length a plurality of areas between said first layer and said second layer are unbonded so as to define a plurality of non-interconnected passageways, each said passageway intersecting with at least one opening formed through said first planar layer, each said passageway extending to an edge of said second planar layer so as to define a lateral passageway opening, thereby forming one of a plurality of one-way valves integrally formed in the sheet material, wherein the sheet material includes a plurality of sealing regions, each one of said sealing regions including one of said one-way valves and said sealing regions are spaced apart along said length for closing separate containers, such that a plurality of the containers may be sealed by said band of the sheet material.

2. The sheet material of claim 1, wherein each said one-way valve is configured to create a vacuum state within a container at least sealed by the sheet material.

3. The sheet material of claim 1, wherein each said one-way valve is configured to create a pressurized state within a container at least sealed by the sheet material.

4. A sheet material for the construction of containers in which a pressure differential is created and maintained, the sheet material comprising a band of sheet material fabricated by the bonding together of a band of a first planar layer having a first width and a band of a second planar layer having a second width, said second width being less than said first width and said first planar layer and said second planar layer are bonded across an entire width of said second planar layer, wherein said first and second layers are substantially parallel and said first planar layer and said second planar layer are coextensive along at least a length of the sheet material, said bonding being such that along said length a plurality of areas between said first layer and said second layer are unbonded so as to define a plurality of non-interconnected passageways, each said passageway intersecting with at least one opening formed through said first planar layer, each said passageway extending to an edge of said second planar layer so as to define a lateral passageway opening, thereby forming a one-way valve integrally formed in the sheet material, wherein a portion of said band of sheet material constitutes at least a portion of a container and said portion includes at least one of said one-way valves, and said band of sheet material includes a plurality of said portions spaced along said length such that a plurality of the containers may be formed by the sheet material.

5. The sheet material of claim 4, wherein said sheet material constitutes at least a portion of sealing material attached to a solid container.

6. A method for fabricating a band of sheet material for use in packaging for closing containers, the method comprising:
   (a) providing at least a band of a first planar layer having a first width;
   (b) providing at least a band of a second planar layer having a second width, said second width being less than said first width; and,
   (c) bonding together said band of said first planar layer and said band of said second planar layer across an entire width of said second planar layer to fabricate the band of sheet material in which said first and second layers are substantially parallel and said first planar layer and said second planar layer are coextensive along at least a length of the sheet material such that along said length a plurality of areas between said first layer and said second layer are unbonded so as to define a plurality of non-interconnected passageways, each said passageway intersecting with at least one opening formed through said first planar layer, each said passageway extending to an edge of said second planar layer so as to define a lateral passageway opening, thereby forming one of a plurality of one-way valves integrally formed in the sheet material, wherein the band of sheet material includes a plurality of sealing regions, each one of said sealing regions including one of said one-way valves, said sealing regions being spaced apart along said length for closing separate containers such that a plurality of the containers may be sealed by the band of sheet material.

* * * * *